United States Patent
Hess

(10) Patent No.: US 9,216,728 B2
(45) Date of Patent: Dec. 22, 2015

(54) PROCEDURE FOR OPERATING DECELERATING DOWNSHIFTS WITH THE PARTICIPATION OF A FORM-LOCKING SHIFT ELEMENT OF AN AUTOMATIC TRANSMISSION COMPRISING A TORQUE CONVERTER LOCKUP CLUTCH

(71) Applicant: Christoph Hess, Eriskirch (DE)

(72) Inventor: Christoph Hess, Eriskirch (DE)

(73) Assignee: Z Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/179,612

(22) Filed: Feb. 13, 2014

(65) Prior Publication Data
US 2014/0274554 A1 Sep. 18, 2014

(30) Foreign Application Priority Data
Mar. 14, 2013 (DE) .................. 10 2013 204 411

(51) Int. Cl.
*B60W 10/11* (2012.01)
*B60W 10/04* (2006.01)

(52) U.S. Cl.
CPC ............ *B60W 10/11* (2013.01); *B60W 10/04* (2013.01); *Y10T 477/6403* (2015.01)

(58) Field of Classification Search
None
See application file for complete search history.

(56) References Cited

U.S. PATENT DOCUMENTS

| | | | |
|---|---|---|---|
| 5,480,363 A * | 1/1996 | Matsubara et al. | 477/63 |
| 8,142,332 B2 | 3/2012 | Dreibholz et al. | |
| 8,394,000 B2 | 3/2013 | Popp et al. | |
| 2002/0193202 A1* | 12/2002 | Toyoda et al. | 477/62 |
| 2009/0098978 A1* | 4/2009 | Lee et al. | 477/62 |
| 2010/0151991 A1* | 6/2010 | Mair et al. | 477/77 |
| 2010/0185368 A1* | 7/2010 | Schneider et al. | 701/53 |
| 2010/0198468 A1* | 8/2010 | Ota et al. | 701/55 |
| 2011/0230308 A1* | 9/2011 | Inoue et al. | 477/54 |
| 2012/0142494 A1* | 6/2012 | Yamada et al. | 477/175 |
| 2014/0200113 A1* | 7/2014 | Kawamoto et al. | 477/53 |

FOREIGN PATENT DOCUMENTS

DE 10 2008 000 342 A1 8/2009
DE 10 2008 001 566 A1 11/2009

OTHER PUBLICATIONS

German Search Report Corresponding to 10 2013 204 411.9 mailed Nov. 6, 2013.

* cited by examiner

*Primary Examiner* — Erin D Bishop
(74) *Attorney, Agent, or Firm* — Davis & Bujold, P.L.L.C.; Michael J. Bujold

(57) ABSTRACT

A method of carrying out coasting downshifts that involve an interlocking shifting element in an automatic transmission having a torque converter lockup clutch. At the beginning of the coasting downshift, positive action is taken on the torque. The method including the steps of, at the beginning of the coasting downshift, the torque converter lockup clutch is fully or partially disengaged so that the drive-train is fully or partially decoupled from the drive aggregate, and action upon the torque is carried out in such manner that the engine rotational speed only falls below the turbine rotational speed once the synchronous point for the interlocking shifting element is reached.

6 Claims, 2 Drawing Sheets

PROCEDURE FOR OPERATING DECELERATING DOWNSHIFTS WITH THE PARTICIPATION OF A FORM-LOCKING SHIFT ELEMENT OF AN AUTOMATIC TRANSMISSION COMPRISING A TORQUE CONVERTER LOCKUP CLUTCH

This application claims priority from German patent application serial no. 10 2013 204 411.9 filed Mar. 14, 2013.

FIELD OF THE INVENTION

The present invention concerns a procedure for operating decelerating downshifts with the participation of a form-locking shift element of an automatic transmission comprising a torque converter lockup clutch.

BACKGROUND OF THE INVENTION

In downshifts that involve an interlocking shifting element, for example a claw clutch, it is known from the prior art that the synchronization of the interlocking shifting element can be actively assisted by controlling the engine behavior, namely by positive action upon the torque or by appropriate control of the rotational speed.

However, this has the disadvantageous result that precisely in the case of coasting downshifts, i.e. gearshifts with a negative engine torque, the shift becomes a traction shift. The consequence is that this change of condition leads to a cross-over of the engine and turbine rotational speeds, which can be perceptible and impairs comfort for the driver.

This is particularly noticeable when the action upon the engine is discontinued and the engines rotational speed falls back again with a steep gradient below the turbine rotational speed, which in the prior art is the case shortly before the end of the shift and gives rise to a perceptible jerk. Furthermore, the slight difference between the turbine rotational speed and the engine rotational speed existing in the prior art at the moment when the claw clutch is engaged, also increases the risk that the engagement of the claws of the claw clutch will be perceptible.

SUMMARY OF THE INVENTION

The purpose of the present invention is to indicate a method for carrying out coasting downshifts that involve an interlocking shifting element in an automatic transmission comprising a torque converter lockup clutch, wherein at the beginning of the coasting downshift the torque is acted upon positively, whereby comfort for the driver is improved. In particular, jerking just before the end of the shift should be avoided.

According to these, a method is proposed for carrying out a coasting downshift that involves an interlocking shifting element in an automatic transmission comprising a torque converter lockup clutch, wherein at the beginning of the coasting downshift positive action is taken upon the torque, in which method at the beginning of the coasting downshift the torque converter lockup clutch is opened partially or completely so that the drive-train is partially or completely decoupled from the drive aggregate, the latter being as a rule in the form of an internal combustion engine. The action upon the torque is then carried out in such manner that the engine rotational speed does not fall below the turbine rotational speed until the synchronous speed in the interlocking shifting element has been reached.

In a first variant of the method according to the invention, at the beginning of the coasting downshift the torque converter lockup clutch is opened completely and the shifting point of the transmission is then controlled on the basis of various criteria, such as the type of shift, the engine torque at the time and/or the accelerator pedal position, in such manner that the standard sequence is overridden and an opening command for the converter lockup clutch and an information flag on the vehicle CAN are transmitted. The result of this is that the converter clutch is opened. On the basis of the information flag the opening of the converter clutch can be controlled by means of variable parameters with different degrees of comfort.

In a second variant of the method according to the invention, the torque converter lockup clutch is opened partially and caused to operate with slip, and in a further development of the invention, within the control software for the converter clutch the shifts concerned are carrier out with individualized parameters. These include various slip specifications for each coasting downshift in which an interlocking shifting element is involved and/or different filtering parameters for the filtering of the desired slip value of the torque converter clutch.

BRIEF DESCRIPTION OF THE DRAWINGS

Below, an example of the invention is explained in more detail with reference to the attached figures, which show.

DETAILED DESCRIPTION OF THE PREFERRED EMBODIMENTS

Figure 1:
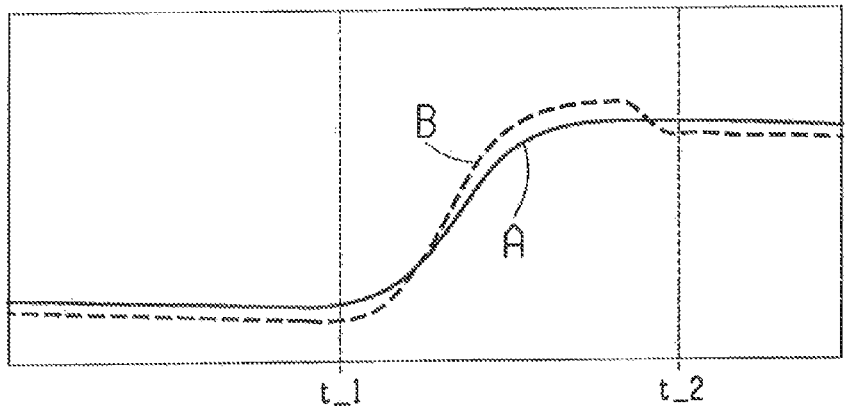
FIG. 1: The variation of the engine rotational speed and the turbine rotational speed as functions of time during a coasting downshift carried out in accordance with the prior art, which shift involves an interlocking shifting element in an automatic transmission comprising a torque converter lockup clutch.
Figure 2:
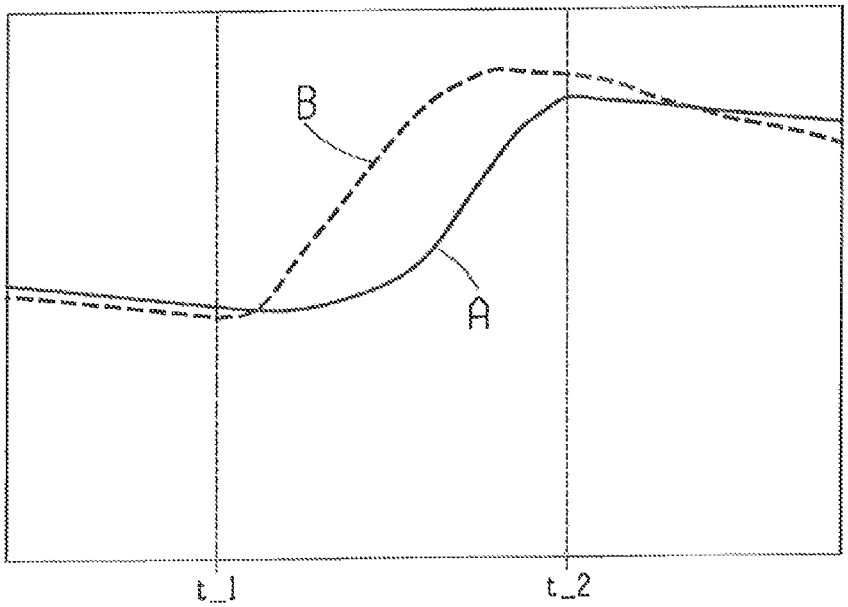
FIG. 2: The variation of the engine rotational speed and the turbine rotational speed as functions of time during a coasting downshift carried out in accordance with a first variant of the invention, which shift involves an interlocking shifting element in an automatic transmission comprising a torque converter lockup clutch.
Figure 3:
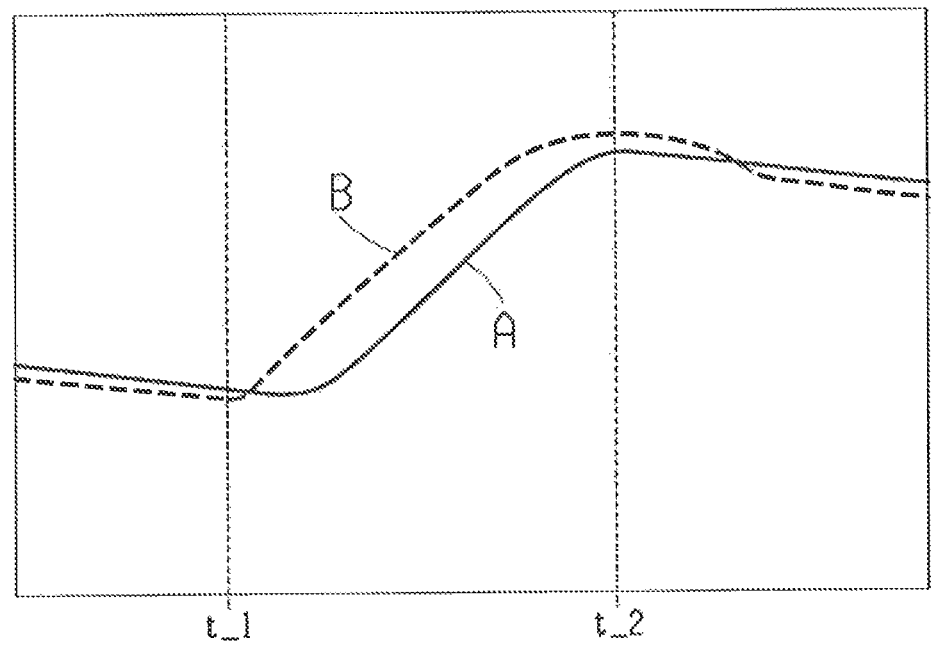
FIG. 3: The variation of the engine rotational speed and the turbine rotational speed as functions of time during a coasting downshift carried out in accordance with a second variant of the invention, which shift involves an interlocking shifting element in an automatic transmission comprising a torque converter lockup clutch.

In the attached FIGS. 1, 2 and 3 curve A shows the time variation of the turbine rotational speed while curve B shows the time variation of the engine rotational speed. Furthermore, $t\_1$ is the time-point when the coasting downshift is initiated and $t\_2$ is the time-point when the coasting downshift ends and the synchronous point in the interlocking shifting element is reached.

Referring to FIG. 1, which shows the time variations of the engine rotational speed and the turbine rotational speed during a coasting downshift carried out as in the prior art and involving an interlocking shifting element in an automatic transmission that comprises a torque converter lockup clutch, at the beginning of the coasting downshift positive action is taken on the torque with the result that the engine rotational speed rises above the turbine rotational speed which is also increasing due to the coasting downshift. Shortly before the synchronous point is reached in the interlocking shifting element, the action upon the torque is discontinued with the consequence that the engine rotational speed falls below the turbine rotational speed with a steep gradient. As already explained, this results in a load-change impulse with a perceptible jerk.

In a first variant of the invention, at the beginning of the coasting downshift the torque converter lockup clutch is opened fully so that the transmission is completely decoupled from the internal combustion engine. The variations of the turbine rotational speed and the engine rotational speed are equalized. Referring to FIG. 2, this procedure leads initially to an increase of the turbine rotational speed after the coasting downshift has been started, which is slower than during a downshift according to the prior art. The opening of the converter lockup clutch can be controlled to take place with varying degrees of comfort.

As can be seen in FIG. 2, the engine speed only falls below the turbine rotational speed after the synchronous point has been reached in the interlocking shifting element, and this advantageously takes place with a relatively low gradient. At the moment when the synchronous point is reached in the interlocking shifting element the rotational speed difference between the turbine rotational speed and the engine section larger than in the prior art, so the risk that the engagement of the claws of the interlocking shifting element will be perceptible is reduced.

In the example shown in FIG. 3, at the beginning of the coasting downshift the torque converter lockup clutch is partially opened so that the transmission is partially decoupled from the internal combustion engine. In this case too, the variations of the turbine rotational speed and the engine rotational speed are equalized, and when the coasting downshift has been started the turbine rotational speed initially increases more slowly than during a downshift according to the prior art, but more rapidly than when the torque converter lockup clutch has been fully opened.

At the moment when the synchronous point is reached in the interlocking shifting element the rotational speed difference between the turbine rotational speed and the engine rotational speed is larger that in the prior art, so that in this case too the risk that the engagement of the claws of the interlocking shifting element will be perceptible is reduced. Analogously to the variant illustrated in FIG. 2, only after the synchronous point has been reached in the interlocking shifting element does the engine rotational speed fall below the turbine rotational speed, this taking place with a relatively low gradient.

INDEXES

A Time variation of the turbine rotational speed
B Time variation of the engine rotational speed
t_1 Time-point when the coasting downshift is initiated
t_2 Time-point when the coasting downshift ends and the synchronous point is reached in the interlocking shifting element

The invention claimed is:

1. A method of carrying out a coasting downshift that involves an interlocking shifting element arranged in an automatic transmission, the automatic transmission further including a torque converter having a disengageable torque converter lockup clutch for adjusting torque transmitted between an engine and the automatic transmission, the method comprising the steps of:
commencing the coasting downshift associated with the interlocking shifting element in order to initiate engagement of the interlocking shifting element,
at a beginning of the coasting downshift, either fully or partially disengaging the torque converter lockup clutch for either fully or partially decoupling a driving connection between a drive-train, including the transmission, and the engine and allowing a turbine rotational speed to fall below an engine rotational speed,
reaching a synchronous point for the interlocking shifting element, and
only once the engine rotational speed falls below the turbine rotational speed and the synchronous point for the interlocking shifting element is reached, then engaging the interlocking shifting element and re-engaging the torque converter lockup clutch to re-couple the driving connection of the engine to the drivetrain.

2. The method of carrying out the coasting downshift according to claim 1, further comprising a step of adjusting a timing of a complete disengagement of the torque converter lockup clutch based on at least one of a type of shift, an engine torque, and an accelerator pedal position.

3. The method of carrying out the coasting downshift according to claim 1, further comprising a step of utilizing at least one of slip values of the torque converter lockup clutch and slip value filters in software for the torque converter lockup clutch to carry out the coasting downshifts.

4. A method of carrying out a coasting downshift that involves an interlocking shifting element in an automatic transmission, the automatic transmission further comprising a torque converter having a disengageable lockup clutch, the method comprising the steps of:
at a beginning of the coasting downshift, fully decoupling a driving connection from an engine to a drivetrain, including the transmission, by fully disengaging the lockup clutch of the torque converter;
carrying out the full decoupling of the drive aggregate from the drive-train;
reaching a synchronous point for the interlocking shifting element;
then engaging the interlocking shifting element and fully re-engaging the lockup clutch of the torque converter to fully re-couple the driving connection of the drive aggregate to the drive-train such that an engine rotational speed only falls below a turbine rotational speed once the synchronous point in the interlocking shifting element is reached.

5. The method of carrying out the coasting downshift according to claim 4, further comprising a step of adjusting a timing of complete disengagement of the torque converter lockup clutch based on at least one of a type of shift, an engine torque and an accelerator pedal position.

6. The method of carrying out the coasting downshift according to claim 4, further comprising a step of utilizing at least one of slip values of the torque converter lockup clutch and torque converter lockup clutch slip value filters in software controlling the torque converter lockup clutch, during the coasting downshifts.

* * * * *